United States Patent [19]

Utsunomiya et al.

[11] Patent Number: 4,507,418

[45] Date of Patent: Mar. 26, 1985

[54] RUBBER COMPOUND FOR CONVEYOR BELTS

[75] Inventors: Tadashi Utsunomiya, Yokohama; Yasuhiko Matsumuro, Tokyo; Hideaki Saigo, Yokohama, all of Japan

[73] Assignee: Bridgestone Tire Company Limiited, Tokyo, Japan

[21] Appl. No.: 536,970

[22] Filed: Sep. 29, 1983

[30] Foreign Application Priority Data

Oct. 6, 1982 [JP] Japan .............................. 57-175889

[51] Int. Cl.$^3$ .............................................. C08K 5/10
[52] U.S. Cl. ...................................... 524/318; 524/571
[58] Field of Search ............................. 524/318, 571

[56] References Cited

U.S. PATENT DOCUMENTS

| | | | |
|---|---|---|---|
| 2,485,910 | 10/1949 | Myers et al. | 524/318 |
| 2,569,541 | 10/1951 | Selby | 524/318 |
| 2,633,456 | 3/1953 | Vaughan | 524/318 |

*Primary Examiner*—Joseph L. Schofer
*Assistant Examiner*—N. Sarafin
*Attorney, Agent, or Firm*—Birch, Stewart, Kolasch & Birch

[57] ABSTRACT

A rubber compound essentially for use in making conveyor belts on which tacky materials such as oil sands are transported without adhesion, comprising a base rubber such as acrylonitrile-butadiene rubbers, urethane rubbers, acryl rubbers and blends of these rubbers with polybutadiene rubbers, styrene-butadiene rubbers and natural rubbers, and an organic carboxylate such as alkyl oleates and alkyl stearates.

18 Claims, 2 Drawing Figures

RUBBER COMPOUND FOR CONVEYOR BELTS

BACKGROUND OF THE INVENTION

This invention relates to rubber compounds essentially for use in making conveyor belts, and more particularly, to rubber compounds of which conveyor belts for use in transporting tacky materials such as oil sands are made, and which are capable of preventing adhesion of such tacky materials to the belts.

Oil sands are clay-like materials based on quartz sand and containing a high proportion of a tar-like material or bitumen from which a crude oil is synthetized as by cracking. It has long been a problem in the art that oil sands tend to adhere to conveyor belts by which oil sands are transported to the destination. Oil sands adhere to and build up to a substantial thickness on conventional conveyor belts.

To overcome this adhesion problem, one prior art method employed is by applying kerosine, anti-freeze or aqueous surfactant solution to the surface of conveyor belts before use, thereby preventing oil sands from adhering to and building up on the conveyor belts. This method, however, increases the cost of transportation because of increased installation and material costs. The use of kerosine suffers from the problem of increasing the danger of a fire. There has been a great need for the development of a rubber compound for conveyor belts which is capable of preventing adhesion of oil sands without applying anti-adhesion agents such as kerosine to the belts.

SUMMARY OF THE INVENTION

It is, therefore, an object of the present invention to provide a rubber compound for use in making conveyor belts which is capable of preventing adhesion of tacky materials such as oil sands.

In order to meet the above-mentioned need, the inventors have made extensive investigations on conveyor belt-forming rubber compounds which can minimize the adhesion of tacky materials and are suitable for the transport of tacky materials, typically oil sands, and have found that rubber compounds to which organic carboxylates are incorporated or applied have improved antiadhesion effect and are particularly effective in preventing the adhesion of oil sands so that these rubber compounds are optimum rubber compounds for use in making conveyor belts for transporting tacky materials, typically oil sands.

Broadly, the present invention provides a rubber compound essentially for use in making conveyor belts, comprising a base rubber admixed or applied with an organic carboxylate.

The rubber compounds to which organic carboxylates are incorporated or applied according to the present invention may be advantageously used in making conveyor belts for transporting bitumen-containing oil sands because the esters in the compounds partially bleed at the belt surface to effectively prevent the adhesion of tacky materials even at relatively low temperatures.

The conveyor belts which are made of the rubber compounds of the present invention are thus capable of preventing the adhesion of tacky materials such as oil sands without the need for applying special anti-adhesion agents such as kerosine, resulting in the benefits of reduced transport cost, minimized danger of a fire, and ease of maintenance.

In the preferred embodiment of the present invention, the base rubber is selected from acrylonitrilebutadiene rubbers, urethane rubbers, and acryl rubbers, and blends thereof with other rubbers such as polybutadiene rubbers, styrene-butadiene rubbers and natural rubbers. The organic carboxylate may be an ester of an aliphatic carboxylic acid with an aliphatic alcohol, and more preferably, an alkyl oleate such as methyl oleate, butyl oleate, n-octyl oleate, etc., or an alkyl stearate such as butyl stearate, etc. The organic carboxylate is used in an amount of 2 to 100 parts by weight per 100 parts by weight of the base rubber. The object of the present invention is more effectively attained by the rubber compounds of these embodiments.

BRIEF DESCRIPTION OF THE DRAWINGS

The above and other objects, features, and advantages of the present invention will be more fully understood by reading the following description taken in conjunction with the accompanying drawings, in which.

DETAILED DESCRIPTION OF THE INVENTION

Figure 1:
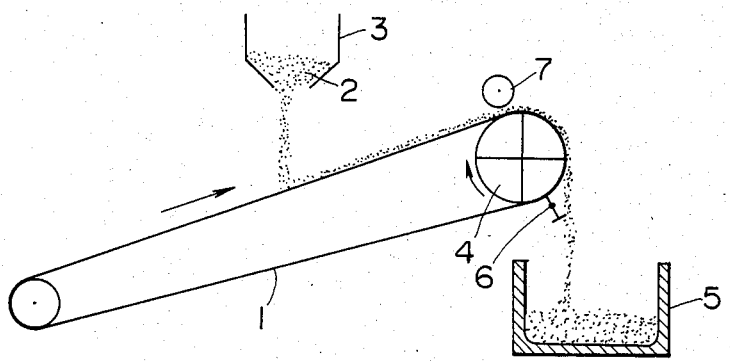
FIG. 1 and FIG. 2 are schematic views of apparatus for determining the adhesion of oil sand to the rubber belt, respectively.

The rubber compound for conveyor belts according to the invention comprises a base rubber and an organic carboxylate and is prepared by blending the organic carboxylate into the base rubber and vulcanizing the resulting compound or by applying the carboxylate to the vulcanized rubber.

The organic carboxylates used herein may preferably be an ester of an aliphatic carboxylic acid with an aliphatic alcohol. The aliphatic carboxylic acids may preferably be saturated and unsaturated, monobasic and dibasic aliphatic carboxylic acids. More particularly, the monobasic carboxylic acids are those containing 10 to 30 carbon atoms, and the dibasic carboxylic acids are those containing 6 to 10 carbon atoms. Some illustrative, non-limiting examples of the monobasic carboxylic acids include capric acid, lauric acid, myristic acid, palmitic acid, stearic acid, undecylenic acid, oleic acid, etc., and examples of the dibasic carboxylic acids include adipic acid, sebacic acid, azelaic acid, etc. When the dibasic carboxylic acids are used, it is desired that all the carboxyl groups be esterified. The aliphatic alcohols may preferably be saturated and unsaturated monohydric alcohols, particularly those containing 2 to 10 carbon atoms. Some illustrative, non-limiting examples of the aliphatic alcohols include ethyl alcohol, propyl alcohol, butyl alcohol, pentyl alcohol, octyl alcohol, nonyl alcohol, decyl alcohol, etc. It is to be noted that the alcohols may be modified ones, for example, epoxidized ones. Among these esters, esters of organic carboxylic acids such as oleates and stearates are effective, and particularly, butyl oleate, n-octyl oleate, methyl oleate, butyl stearate, etc. are most advantageously used. The organic carboxylates may be used alone or in admixture of two or more.

The amount of the organic carboxylates used is an effective amount capable of providing a substantial improvement in adhesion prevention, and generally ranges from 2 to 100 parts by weight, preferably from 5 to 60 parts by weight, and most preferably from 10 to 50 parts by weight per 100 parts by weight of the base rubber. Outside this range, less amounts of the carboxylate cannot exert substantial effect whereas larger amounts will impair the rubbery properties of the compounds.

The type of base rubber with which the organic carboxylates are combined is not particularly limited and may be either natural or synthetic rubbers. Some illustrative, non-limiting examples of the synthetic rubbers include polybutadiene rubbers (BR), polyisoprene rubbers (IR), styrene-butadiene rubbers (SBR), butyl rubbers (IIR), halogenated butyl rubbers, chloroprene rubbers (CR), acryl rubbers (polyacrylate rubbers), silicone rubbers, silicone-ethylene-propylene rubbers, chlorosulfonated polyethylenes, ethylene-vinyl acetate copolymers (EVA), chlorinated polyethylenes, ethylene-propylene rubbers (EPT), ethylene-propylene terpolymers (EPDM), butadiene-acrylonitrile rubbers (NBR), urethane rubbers (polyurethane rubbers), etc. Among these, relatively higher polarity rubbers are preferred, for example, acrylonitrile-butadiene rubbers (NBR), urethane rubbers, and acryl rubbers. The use of these polar rubbers minimizes adhesion to tacky materials. Blends of acrylonitrile-butadiene rubbers, urethane rubbers or acryl rubbers with other rubbers such as polybutadiene rubbers (BR), styrene-butadiene rubbers (SBR) or natural rubbers (NR) are also preffered as a base rubber for the purpose of improving low-temperature resistance. The base rubbers may also be used alone or in blends of two or more.

The rubber compounds for conveyor belts according to the present invention may further contain a variety of conventional additives, if desired. Examples of such additives include 0–150 parts by weight, preferably 20–100 parts by weight per 100 parts by weight of the base rubber of reinforcing and non-reinforcing fillers such as carbon black, white carbon, calcium carbonate, metal oxides (for example, zinc oxide), magnesium carbonate, diatomaceous earth, clay, etc.; antioxidants such as amines, amine-aldehyde reaction products, amineketone reaction products, phenols, etc.; aliphatic acids such as stearic acid; and the like.

The rubber compounds of the present invention may be prepared by blending the above-defined organic carboxylate into the base rubber, further blending optional additives, and then vulcanizing the resulting blend. In the vulcanizing step, any of well-known cross-linking or vulcanizing agents such as sulfur, organic sulfur compounds, peroxides (for example, dicumyl peroxide), etc. may be selected and used in an effective amount depending on the particular type of the base rubber or rubbers used. If desired, a vulcanization accelerator such as aldehyde-amines, dithiocarbamates, guanidines, thiurams, thiazoles, thiazolines, and mixtures thereof may be added in an effective amount.

The rubber compounds of the present invention may be used to manufacture conveyor belts. In this case, a belt may be made solely of the rubber compound. Alternatively, the rubber compound may be formed into a sheet with which conveyor belts made of conventional rubber materials may be covered. In either case, it is critical that at least the surface layer of conveyor belts is made of the rubber compounds of the present invention. The conveyor belts manufactured using the rubber compounds of the present invention may be advantageously used in transporting tacky materials including viscous liquids, semisolids and solids based on hydrocarbons, for example, bitumen and asphalt, and mixtures of them with inorganic and organic solids.

Instead of incorporating the organic carboxylate into the base rubber, the organic carboxylate is applied to or impregnated in the surface of the base rubber which is vulcanized without the organic carboxylate after blending the other optional additives. The conveyor belts manufactured by the rubber compounds which comprise the vulcanized base rubber applied with the organic carboxylate are also suitable for transporting tacky materials because of preventing adhesion thereof.

The following examples will further illustrate the practice of the present invention particularly when taken in conjunction with comparative examples. They are given by way of illustration and are not to be construed as limiting the invention.

EXAMPLES 1–3 AND COMPARATIVE EXAMPLES 1–6

Rubber compounds for making conveyor belts were prepared using the rubber compositions as formulated in Tables 1 and 2. In the Tables, all parts are by weight.

TABLE 1

| Ingredient | Comparative Example 1 | Example 1 | Comparative Example 2 | Comparative Example 3 | Example 2 | Comparative Example 4 |
|---|---|---|---|---|---|---|
| NR | 30 | 30 | 30 | — | — | — |
| SBR 1500 | 20 | 20 | 20 | — | — | — |
| BR 01 | 50 | 50 | 50 | — | — | — |
| NBR (Acrylonitrile content 20%) | — | — | — | 100 | 100 | 100 |
| Carbon black (HAF) | 60 | 60 | 60 | 55 | 55 | 55 |
| Butyl oleate | — | 30 | — | — | 30 | — |
| Paraffin oil | — | — | 30 | — | — | — |
| Amide stearate | — | — | — | — | — | 30 |
| Zinc oxide | 3.5 | 3.5 | 3.5 | 5.0 | 5.0 | 5.0 |
| Stearic acid | 1.0 | 1.0 | 1.0 | 1.0 | 1.0 | 1.0 |
| Sulfur | 1.5 | 1.5 | 1.5 | 1.5 | 1.5 | 1.5 |
| Vulcanization accelerator | 2.0 | 2.0 | 2.0 | 2.0 | 2.0 | 2.0 |

NOTE 1: Cross-linking or vulcanizing conditions are 155° C. and 40 minutes.
NOTE 2: Vulcanization accelerator is dibenzothiazyl disulfide.

TABLE 2

| Ingredient | Comparative Example 5 | Example 3 | Comparative Example 6 |
|---|---|---|---|
| Polyurethane rubber | 100 | 100 | 100 |
| Butyl oleate | — | 5 | — |
| Silicone fluid | — | — | 5 |

Note 3: The polyurethane rubber used is prepared by cross-linking a urethane prepolymer with a diamine cross-linker.

Using these rubber compounds, an endless rubber belt 1 having a width of 30 cm and a length (circumferential length) of 4 mm as shown in FIG. 1 was manufactured and subjected to a belt travelling test for determining oil sand adhesion as described below.

BELT TRAVELLING TEST

As shown in FIG. 1, the endless rubber belt 1 made of each of the above-formulated rubber compounds was extended between a pair of rolls and placed below a hopper 3 containing oil sand 2 therein. A drive roll 4 coupled to motor means (not shown) was rotated to drive the belt 1 at a speed of 2 m/sec. in a direction shown by the arrow while the oil sand 2 in the hopper 3 was released and fed onto the belt 1 at a feed rate of 1 kg/min. The oil sand deposited on the belt 1 was moderately leveled by means of a press roll 7 and then dropped from the turn-over of the belt into a container 5 with the aid of a scraper blade 6. After the take-off of the once deposited oil sand, the amount of oil sand which remained adhered to the belt was determined as a measure for adhesion of the rubber belt or rubber compound to oil sand. The test was carried out at a temperature of 10° C.

The oil sand used was a quartz based sand which contained 15% by weight of bitumen.

The results are shown in Table 3.

TABLE 3

| | Test results | Amount of oil sand adhered, g/100 cm$^2$ |
|---|---|---|
| Comparative Example 1 | (NR/SBR/BR) | 1.1 |
| Example 1 | (NR/SBR/BR) | 0.5 |
| Comparative Example 2 | (NR/SBR/BR) | 1.5 |
| Comparative Example 3 | (NBR) | 0.8 |
| Example 2 | (NBR) | 0.05 |
| Comparative Example 4 | (NBR) | 1.1 |
| Comparative Example 5 | (Urethane rubber) | 1.0 |
| Example 3 | (Urethane rubber) | 0 |
| Comparative Example 6 | (Urethane rubber) | 1.5 |

EXAMPLES 4–12 AND COMPARATIVE EXAMPLE 7

The rubber compounds as formulated in Table 4 were milled, vulcanized and cut into sheet-like pieces (10 cm by 6 cm by 0.2 cm thick) which were attached to a testing belt to be described below to measure the build-up of oil sand onto the pieces at room temperature (20° C.). In all the examples, the build-up of oil sand is designated as a relative build-up, that is, expressed on the assumption that the build-up of oil sand in Comparative Example 7 is 100, a lower value indicating a less build-up of oil sand.

The relative build-up of oil sand was measured by the following procedure.

Figure 2:
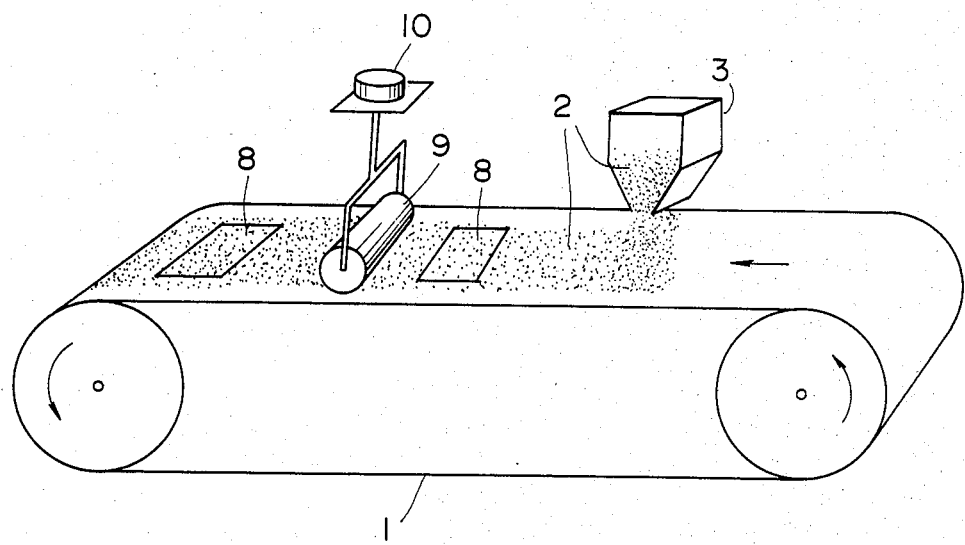

As shown in FIG. 2, an endless belt 1 was recessed at several locations in which rubber pieces 8 were embedded flush and bonded to the belt body. A hopper 3 containing oil sand 2 was placed above the belt 1 and the oil sand 2 was continuously fed at a fixed feed rate onto the belt. As the belt 1 travels in a direction shown by the arrow, the rubber pieces 8 having oil sand deposited thereon were sequentially carried to below a press roll 9 where the oil sand was tightly pressed against the rubber pieces. The pressure applied by the press roll 9 was adjustable by a weight 10. This process was repeated for 30 minutes. The build-up of oil sand was determined by measuing the weight of the pieces before and after the test.

An oil sand originating from Canada was used while the belt was driven at a speed of 40 m/min. and the oil sand was fed at a feed rate of 35 g/min.

TABLE 4

| | Comparative Example 7 | Example 4 | 5 | 6 | 7 | 8 | 9 | 10 | 11 | 12 |
|---|---|---|---|---|---|---|---|---|---|---|
| NBR (Acrilonitrile content 26%) | — | — | — | — | — | — | — | — | 100 | 100 |
| NBR (Acrilonitrile content 20%) | 100 | 100 | 100 | 100 | 100 | 100 | 100 | 100 | — | — |
| Carbon black (HAF) | 55 | 55 | 55 | 55 | 55 | 55 | 55 | 55 | 55 | 55 |
| Butyl oleate | — | 30 | — | — | — | 40 | — | — | 30 | — |
| Methyl oleate | — | — | 30 | — | — | — | — | — | — | — |
| n-Octyl oleate | — | — | — | 30 | — | — | — | — | — | — |
| Butyl stearate | — | — | — | — | 30 | — | 20 | 40 | — | 30 |
| Zinc oxide | 5 | 5 | 5 | 5 | 5 | 5 | 5 | 5 | 5 | 5 |
| Stearic acid | 1 | 1 | 1 | 1 | 1 | 1 | 1 | 1 | 1 | 1 |
| Sulfur | 2 | 2 | 2 | 2 | 2 | 2 | 2 | 2 | 2 | 2 |
| Vulcanization accelerator | 1.5 | 1.5 | 1.5 | 1.5 | 1.5 | 1.5 | 1.5 | 1.5 | 1.5 | 1.5 |
| Relative build-up | 100 | 26 | 25 | 1 | 0.8 | 0.03 | 4 | 0 | 0 | 0 |

NOTE 4: Vulcanizing conditions 150° C., 30 minutes.
NOTE 5: Vulcanization accelerator is dibenzothiazyl disulfide.

As seen from the data of Tables 3 and 4, a substantial amount of oil sand adheres to the belt made of NR/SBR/BR, NBR, and urethane based rubber compounds having no organic carboxylate incorporated whereas the amount of oil sand adhered is minimized or adhesion of oil sand is avoided by incorporating the organic carboxylates into these rubber compounds.

What is claimed is:

1. A rubber compound suitable for use in making conveyor belts, comprising:
   100 parts by weight of a vulcanized base rubber; and
   2 to 100 parts by weight of an organic carboxylate, said rubber compound being prepared by blending said organic carboxylate into a base rubber and vulcanizing the resulting blend or by impregnating the organic carboxylate in a surface of said vulcanized base rubber wherein when said rubber compound is formed into a sheet, said organic carboxylate bleeds at the surface of said sheet to prevent the adhesion of materials to said sheet.

2. The rubber compound according to claim 1, wherein said organic carboxylate is an ester of an aliphatic carboxylic acid with an aliphatic alcohol.

3. The rubber compound according to claim 2, wherein said organic carboxylate is selected from the group consisting of alkyl oleates and alkyl stearates.

4. The rubber compound according to claim 3, wherein said organic carboxylate is selected from the group consisting of methyl oleate, butyl oleate, n-octyl oleate, and butyl stearate.

5. The rubber compound according to claim 1, wherein said base rubber is selected from the group consisting of acrylonitrile-butadiene rubbers, polyurethane rubbers, and polyacrylate rubbers, and blends thereof with polybutadiene rubbers, styrene-butadiene rubbers and natural rubbers.

6. The rubber compound according to claim 1, wherein said base rubber is a polyurethane rubber.

7. The rubber compound according to claim 1, wherein said base rubber is an acrylonitrile-butadiene rubber.

8. The rubber compound according to claim 1, wherein said base rubber is a polyacrylate rubber.

9. The rubber compound according to claim 1, wherein said organic carboxylate is present in an amount of 5 to 60 parts by weight per 100 parts by weight of the base rubber.

10. The rubber compound according to claim 1, wherein said organic carboxylate is present in an amount of 10 to 50 parts by weight per 100 parts by weight of the base rubber.

11. The rubber compound according to claim 1, in the form of a sheet wherein said organic carboxylate bleeds at a surface thereof to prevent adhesion of materials to said surface.

12. The rubber compound according to claim 2, in the form of a sheet wherein said organic carboxylate bleeds at a surface thereof to prevent adhesion of materials to said surface.

13. The rubber compound according to claim 3, in the form of a sheet wherein said organic carboxylate bleeds at a surface thereof to prevent adhesion of materials to said surface.

14. The rubber compound according to claim 4, in the form of a sheet wherein said organic carboxylate bleeds at a surface thereof to prevent adhesion of materials to said surface.

15. The rubber compound according to claim 5, in the form of a sheet wherein said organic carboxylate bleeds at a surface thereof to prevent adhesion of materials to said surface.

16. The rubber compound according to claim 6, in the form of a sheet wherein said organic carboxylate bleeds at a surface thereof to prevent adhesion of materials to said surface.

17. The rubber compound according to claim 7, in the form of a sheet wherein said organic carboxylate bleeds at a surface thereof to prevent adhesion of materials to said surface.

18. The rubber compound according to claim 8, in the form of a sheet wherein said organic carboxylate bleeds at a surface thereof to prevent adhesion of materials to said surface.

* * * * *